No. 697,033. Patented Apr. 8, 1902.
C. STEIN.
VEHICLE TIRE.
(Application filed Oct. 25, 1900. Renewed Sept. 10, 1901.)
(No Model.)
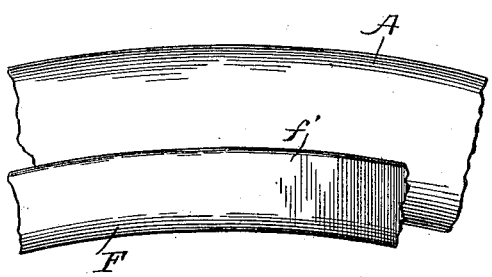
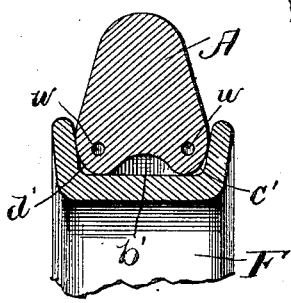
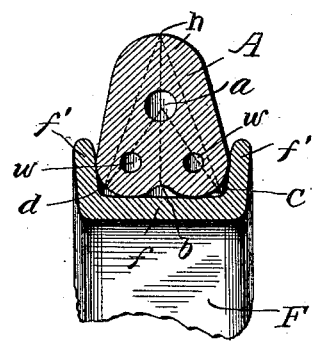
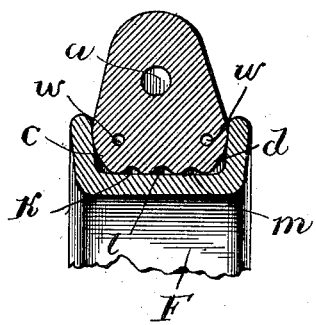
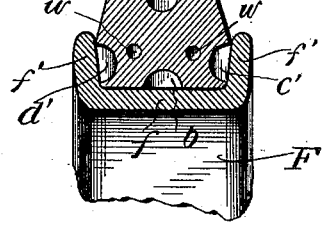
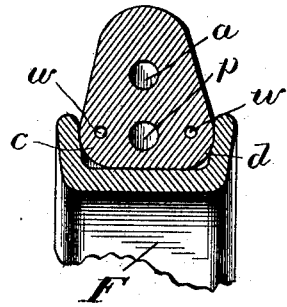
Witnesses
Fenton S. Belt,
Geo. L. Kingsbury,
Inventor,
Charles Stein,
By Mason Fenwick & Lawrence,
Attorneys,
THE NORRIS PETERS CO., PHOTO-LITHO., WASHINGTON, D. C.

UNITED STATES PATENT OFFICE.

CHARLES STEIN, OF MEADVILLE, PENNSYLVANIA, ASSIGNOR TO THE STEIN DOUBLE CUSHION TIRE CO., OF AKRON, OHIO, A CORPORATION OF NEW JERSEY.

VEHICLE-TIRE.

SPECIFICATION forming part of Letters Patent No. 697,033, dated April 8, 1902.

Application filed October 25, 1900. Renewed September 10, 1901. Serial No. 74,929. (No model.)

*To all whom it may concern:*

Be it known that I, CHARLES STEIN, a citizen of the United States, residing at Meadville, in the county of Crawford and State of Pennsylvania, have invented certain new and useful Improvements in Vehicle-Tires; and I do hereby declare the following to be a full, clear, and exact description of the invention, such as will enable others skilled in the art to which it appertains to make and use the same.

This invention relates to tires for vehicles, and more particularly to that class of tires generally made of rubber and seated in a metallic rim and known as "rubber", "elastic," or "cushion" tires, the object of my invention being to so improve this class of tires as to render the same more durable and elastic and to prevent the cutting, chipping, or cracking of the same and securing the cushioning of the tire at every point of contact and to afford spaces for the displacement of the tire. These objects are secured by the combination of a novel tire and felly, whereby a plurality of cushions have correlation with each other and are formed in the manner hereinafter described.

In the accompanying drawings, forming a portion of this application, Figure 1 is a side elevation of a portion of a rim and tire. Fig. 2 is a vertical transverse section through the same. Fig. 3 is a vertical section through the tire and rim, showing a slightly-modified form of tire. Fig. 4 is a vertical transverse section through a tire and rim, showing a slightly-modified form of tire. Fig. 5 is a similar view showing still another slightly-modified construction. Fig. 6 is a vertical transverse section through a rim and tire, showing a modified form of tire.

F in the drawings represents a rim, which is preferably constructed of metal and consists of a horizontal base portion $f$ and upwardly-extending side portions $f'$, which have a slight outward flare, the rim being free from sharp edges, which would tend to cut the tire. The object of constructing the rim approximately of the shape shown in the drawings with inner corners is to form spaces for the displacement of the tire, as will be presently described.

The tire A is provided with a longitudinally-extending aperture $a$, which is arranged at a point intermediate its outer surface or tread $h$ and its under surface. This forms a resilient cushion for the tire at this point. The tire is also provided with smaller apertures $w$ $w$ for the reception of securing-wires, as is common in the art. With the exception of the cushioning-chamber $a$ and the apertures $w$ $w$ the tire is preferably solid throughout. The under side of the tire is formed with an arch or recess $b$, which affords a cushioning-chamber at this point, and the tire is also rounded at its lower corners, so as to form cushioning spaces or chambers $c$ $d$ between said rounded corners and the inner lower corners of the rim. By this construction and arrangement a cushion is formed at $a$, $b$, $c$, and $d$, thereby forming coacting cushions, as shown by the lines drawn from $h$ to $a$, $h$ to $b$, $h$ to $c$, and $h$ to $d$; also, from $a$ to $b$, $a$ to $c$, and $a$ to $d$. The combination of all these cushions in a single wheel is exceedingly important and valuable, as they coact, and the tire is enabled to respond to every shock which it receives, no matter in what direction the same comes, whether in a straight vertical line or at an angle. By this construction and arrangement a lighter and cheaper, as well as more springy and resilient, tire is secured, which can be produced at a reduced cost and being exceedingly resilient adds greatly to the life of the tire and enables the occupant of the vehicle to ride much easier and with greater comfort than where such a combination of cushioning actions is not secured. The omission of any one or more of these cushions will not give the same result and secure the same benefits as where all are employed.

It will be observed that with my construction and arrangement a quadruple cushioning action is secured and that each of the cushioning actions coacts to produce a perfect tire. It will further be observed that the cushioning effect is not only produced between the points indicated by the lines running from $a$ to $b$, $a$ to $c$, and $a$ to $d$, but also from the tread of the tire at the point marked $h$ with all of the cushions $a$ $b$ $c$ $d$.

In Fig. 3 I have shown a slightly-modified form of tire, the cushions c' and d' being produced by forming depressions in the tire opposite the side walls of the rim, the effects and results in this construction being practically the same as those just described in connection with Fig. 2.

In Fig. 4 I have shown the tire corrugated in its under side to form a plurality of arched lower cushions k l m and with the corners of the tire rounded to form cushions c n d. With this construction a very resilient tire is secured with lines of cushioning from a to d, a to k, a to l, a to m, and a to c.

Apertures w w for connecting-wires are also provided, as usual.

In Fig. 5 I have shown the tire provided with two cushions a and p, arranged in the body portion of the tire and one before the other, and with cushions c and d, formed by rounding the outer lower corners of the tire adjacent to the inner lower corners of the rim. This also produces a very resilient and practical tire, possessing many advantages over a solid tire or a partially hollow tire.

In Fig. 6 I have shown another modified construction of tire in which the tire is provided on its under side with a centrally-arranged arch b', a corner-cushion c', and another corner-cushion d'. The usual apertures w w for connecting-wires are employed. With this construction and arrangement a very resilient cushion-tire is secured with cushions b' c' d'.

Having now described the invention, what is claimed as new, and desired to be secured by Letters Patent, is—

1. In a vehicle-tire, the combination of a rim having a channeled portion, and a tire having only a main body portion which has a gradual taper upwardly, and which has its outer lower corners shaped so as to normally leave a space between said lower surfaces and the lower inner surface of the rim, said tire being also formed with a lower arched portion which extends into its main body portion, and a cushioning-aperture above the lower arched portion, and intermediate its tread, and under side, whereby cushioning effects are secured between the tread and the intermediate cushion, and the lower arched cushion and the lower apertured corner-cushions, and between the intermediate cushion and the arched cushion, and the apertured corner-cushions, substantially as described.

2. In a vehicle-tire, the combination of a rim having a channeled portion, and a tire having a main body portion only which has a gradual taper upwardly, the said body portion being substantially triangular in vertical cross-section with rounded corners, the lower surface of said tire being shaped so as to normally leave cushioning-spaces between said lower surface and the lower inner surface of the rim, said tire being also formed with a lower arched portion extending into the triangular-shaped body portion, and with apertures for connecting-wires, substantially as described.

3. In a vehicle-tire, the combination of a suitable rim having a channeled portion and a tire having its outer lower corners curved so as to normally leave a space between said curved portions and the inner lower surfaces of the rim, said tire being also corrugated on its under surface to form a series of cushions, and provided with a cushion intermediate its tread and its under side, whereby cushioning effects are secured between the tread and the intermediate cushion, and between the intermediate cushion and the corner-cushions, and the under cushions, substantially as described.

4. In a vehicle-tire, the combination of a rim having a channeled portion and a tire having only a main, solid body portion which has a gradual taper upwardly, and which has its outer lower corners shaped so as to normally leave spaces between said lower surface and the lower inner surface of the rim, said tire being also formed with a plurality of arched portions which extend into the main body portion thereof, substantially as described.

5. In a vehicle-tire, the combination of a rim having a channeled portion and a tire having a solid main body portion only, and which has a gradual taper upwardly, the entire body portion being substantially triangular in vertical cross-section, the said tire being formed with a lower arched cushion extending into the triangular-shaped body portion and with a central cushion, and with apertures for connecting-wires, the construction and arrangement being such that cushioning effects are secured between the tread of the tire and the central cushion, and the lower arched cushion, substantially as described.

In testimony whereof I hereunto affix my signature in presence of two witnesses.

CHARLES STEIN.

Witnesses:
  WM. J. SCHROPP,
  S. A. CURRY.